Jan. 14, 1936.  D. C. McGUIRE  2,027,607
TUBE WELDING MACHINE
Filed Sept. 22, 1930   7 Sheets-Sheet 1
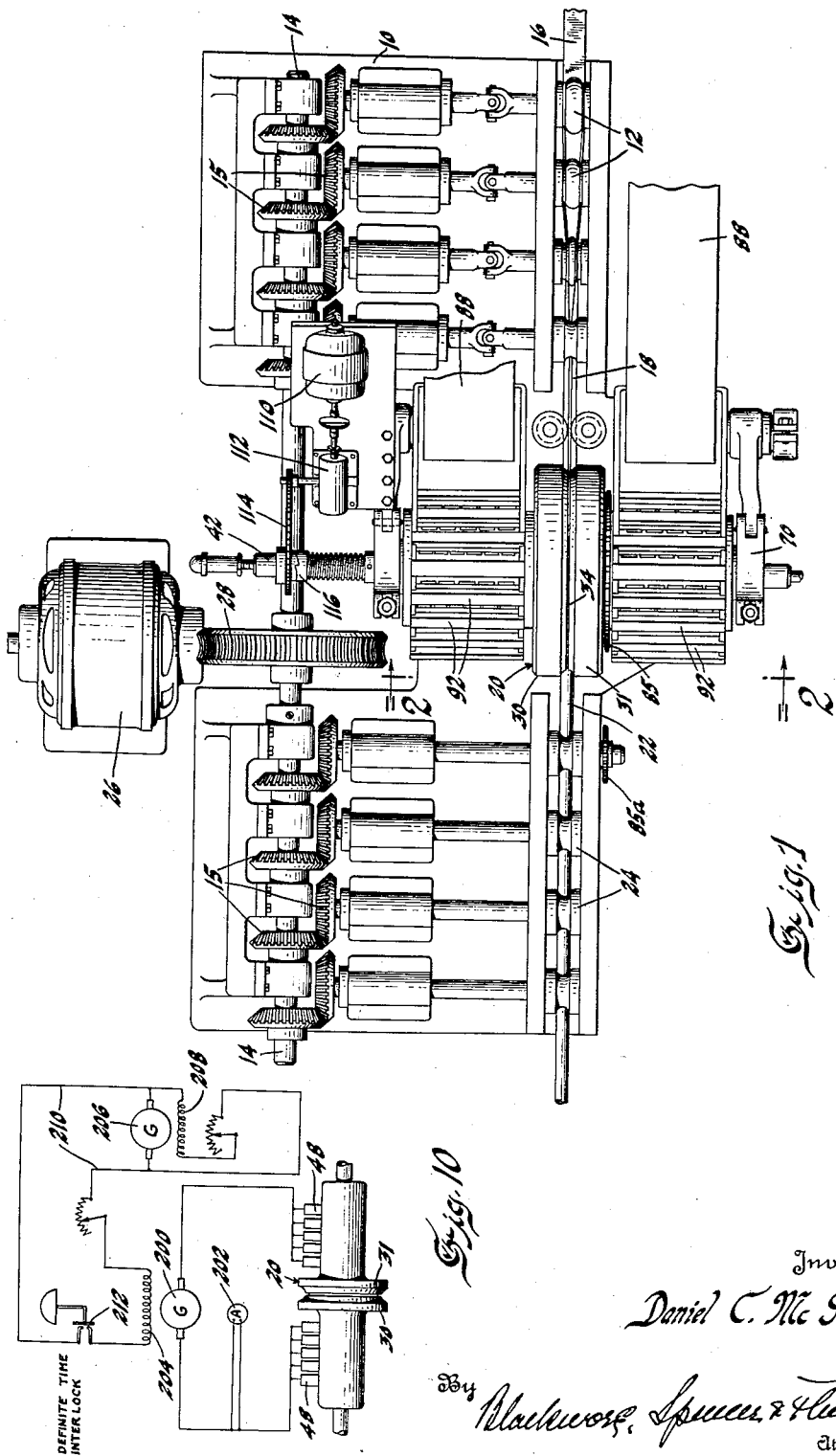
Inventor
Daniel C. McGuire
By Blackmore, Spencer & Hulett
Attorneys

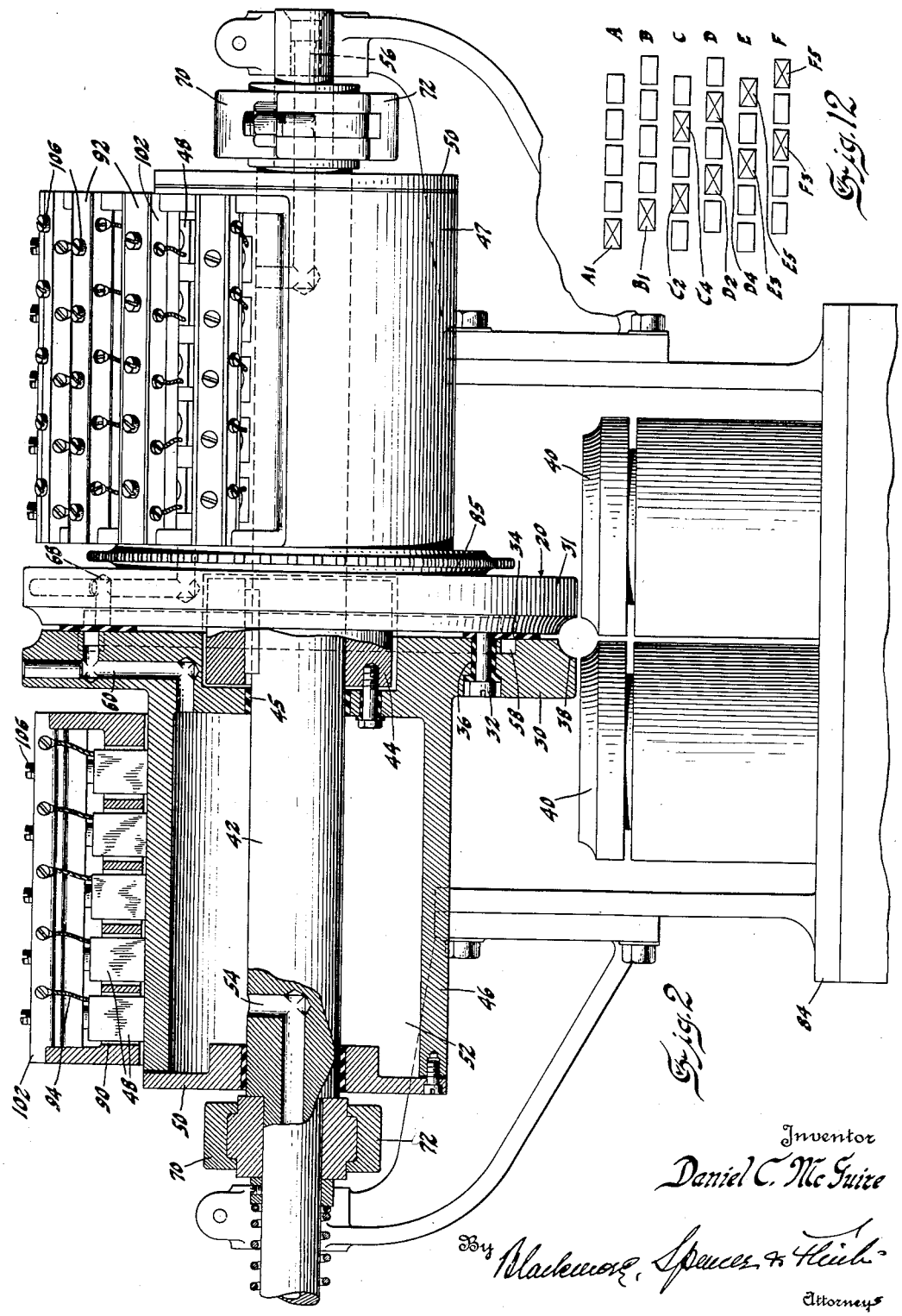

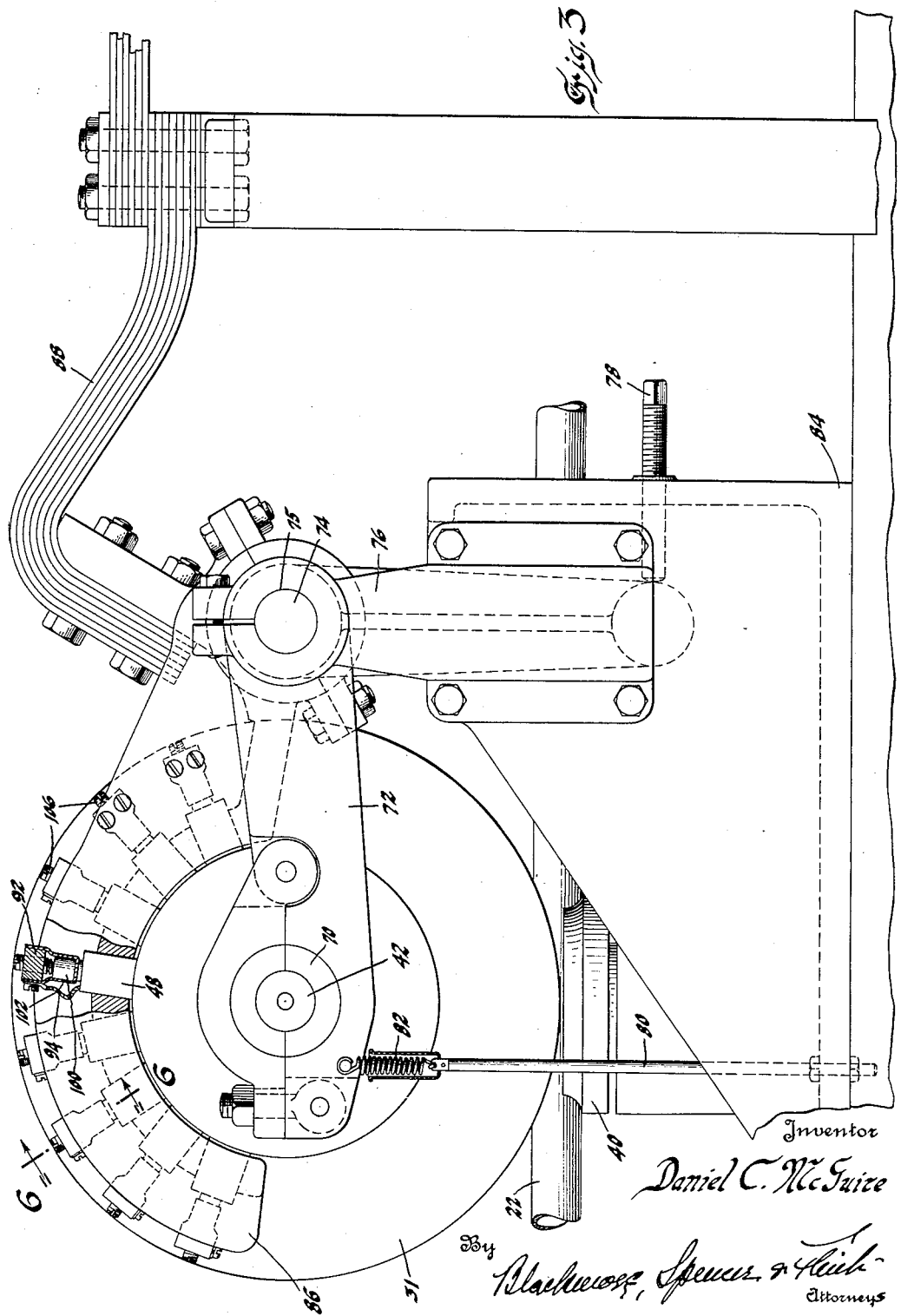

Jan. 14, 1936.　　　　D. C. McGUIRE　　　　2,027,607
TUBE WELDING MACHINE
Filed Sept. 22, 1930　　　　7 Sheets-Sheet 4
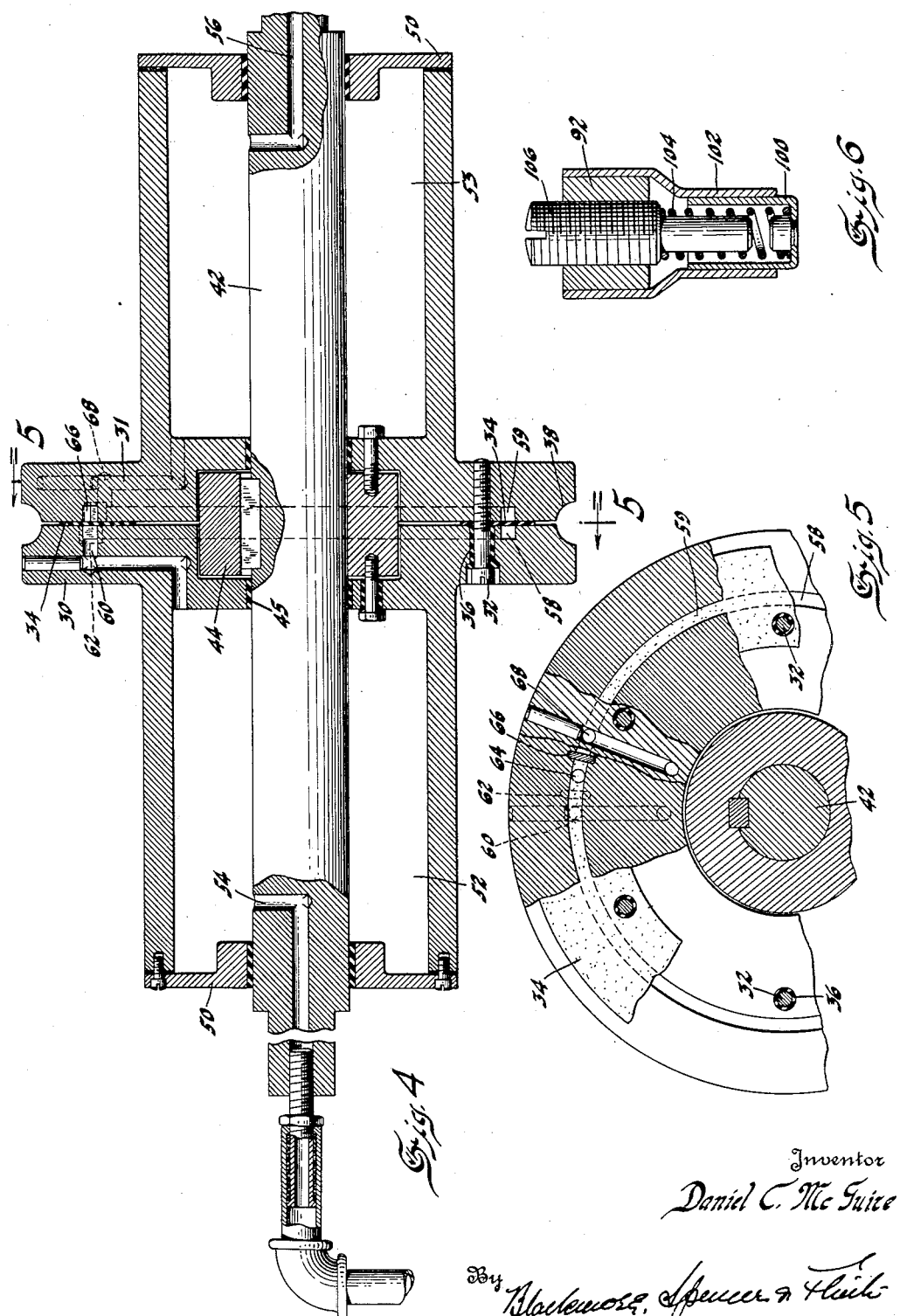
Inventor
Daniel C. McGuire

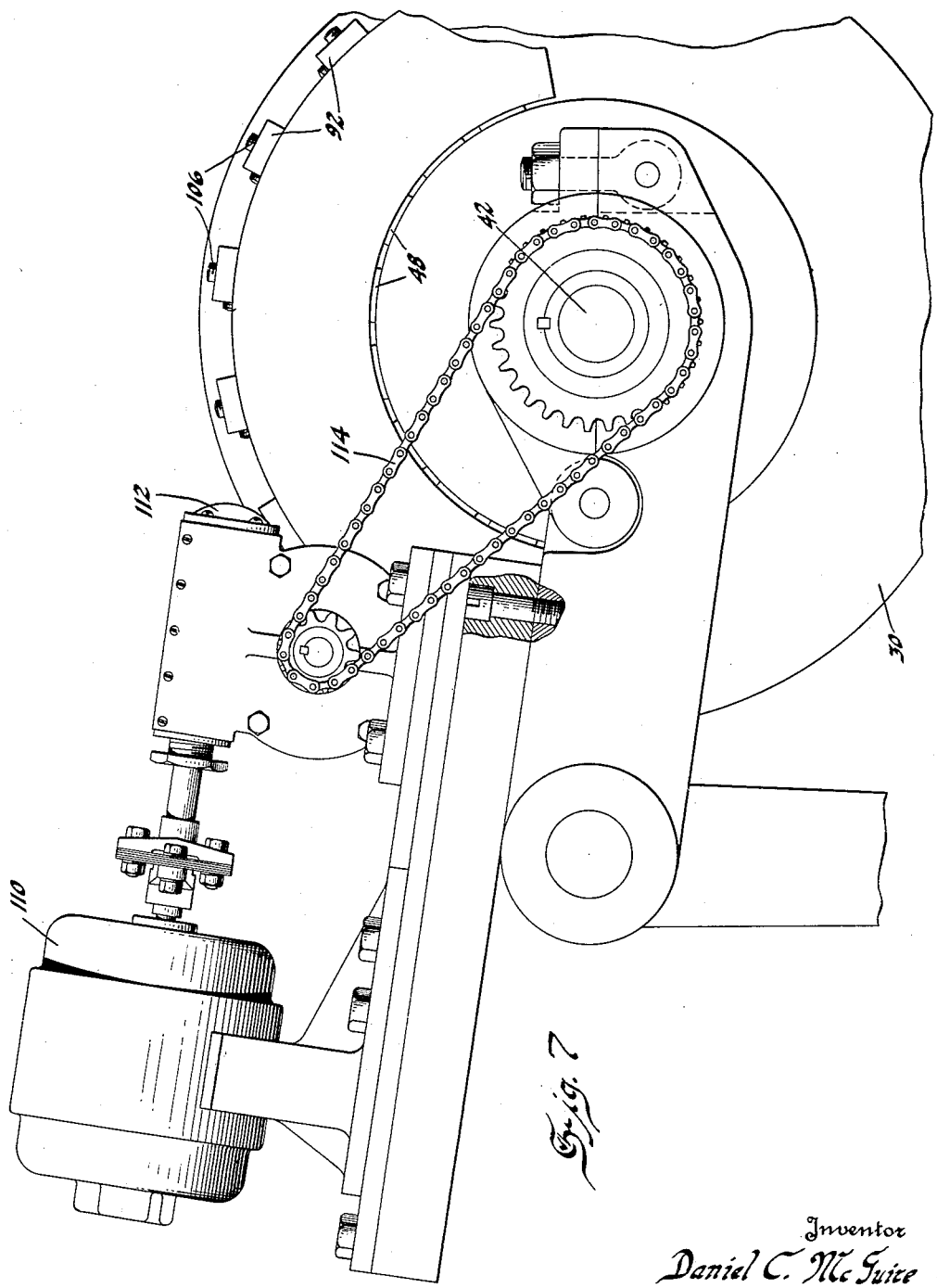

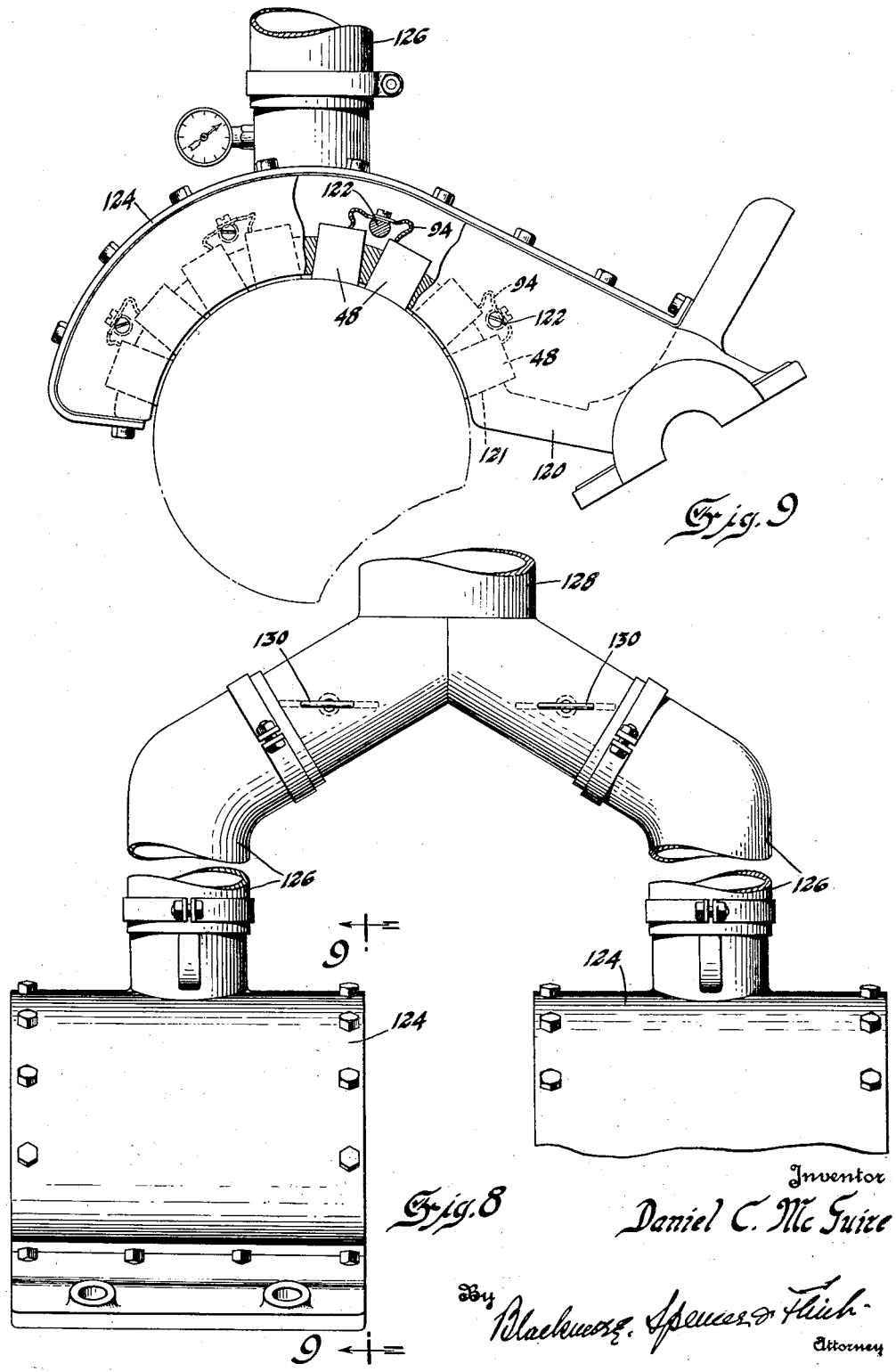

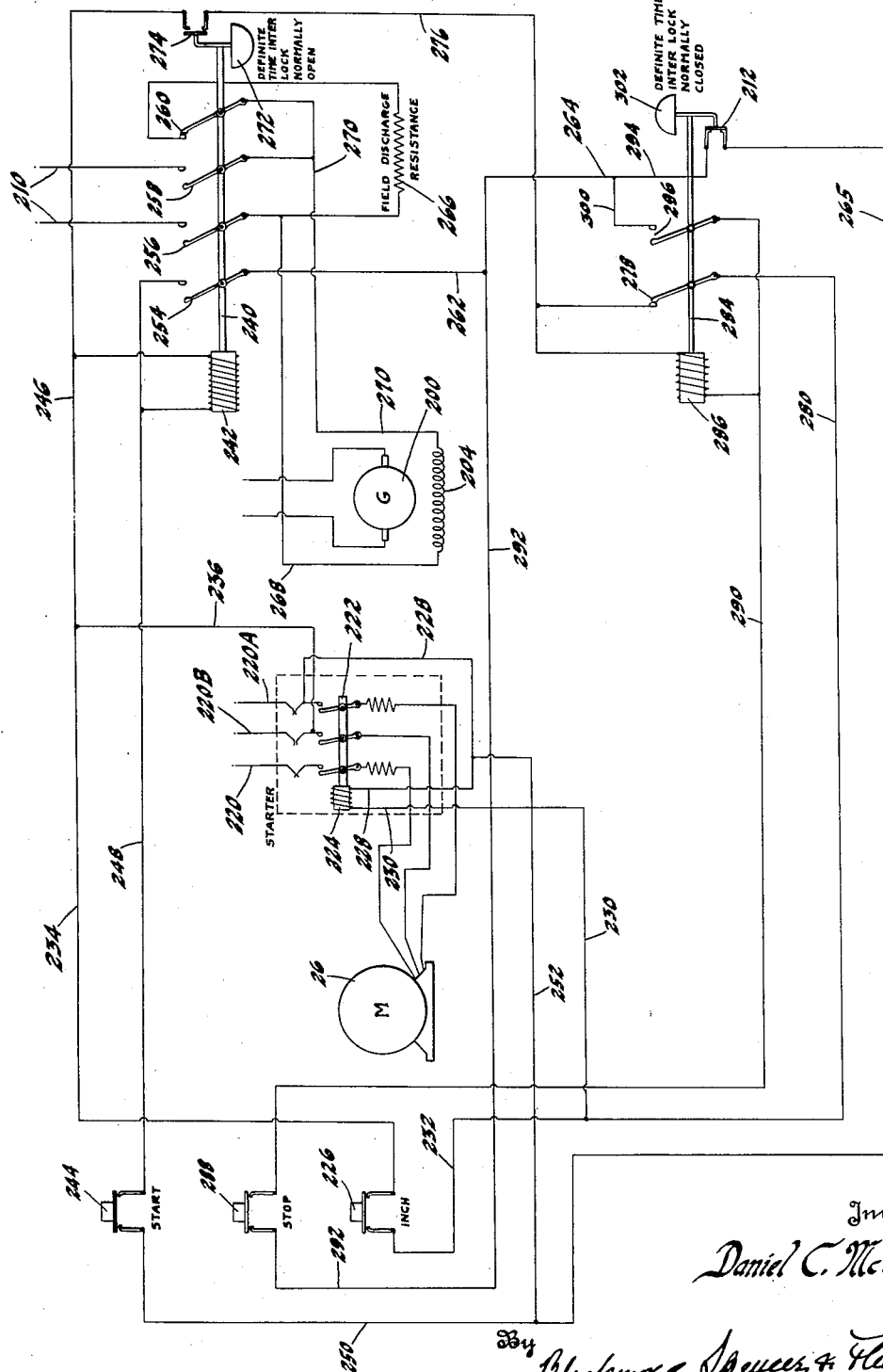

Patented Jan. 14, 1936

2,027,607

UNITED STATES PATENT OFFICE 2,027,607

TUBE WELDING MACHINE

Daniel C. McGuire, Flint, Mich., assignor to General Motors Corporation, Detroit, Mich., a corporation of Delaware Application September 22, 1930, Serial No. 483,583

15 Claims. (Cl. 219—6)

This invention relates to welding and particularly to apparatus for the continuous electric welding of metal stock in the manufacture of tubing.

It is among the objects of the invention to provide an improved welding apparatus which is simple and economical to operate, and one which produces continuously a uniformly welded product, such as steel tubing. More specifically it is an object to provide a machine which will produce a uniformly welded and continuous seam in spite of stopping and starting the apparatus during the welding operation.

Another object is to provide an improved arrangement for controlling the apparatus both as to starting and stopping, and as to energizing and de-energizing the welding circuit.

Another object is to provide an improved welding machine in which slipping is prevented between the welding electrodes and the stock to be welded, while still another object is to provide an improved arrangement for conducting the welding current to the electrodes.

Further objects and advantages of the present invention will be apparent from the following description, reference being made to the accompanying drawings, wherein one form of embodiment of the invention is shown.

In the drawings:

Fig. 1 is a plan of a welding machine constructed in accordance with the invention.

Fig. 2 is an enlarged view of the welding head, partly in elevation and partly in section on the line 2—2 of Fig. 1.

Fig. 3 is an enlarged end elevation of the welding head partly broken away, as seen from the right of Fig. 2.

Fig. 4 is an enlarged longitudinal section of the welding rolls.

Fig. 5 is a fragmentary section on the line 5—5 of Fig. 4.

Fig. 6 is an enlarged sectional view of a detail of one form of brush holder, being drawn on the line 6—6 of Fig. 3.

Fig. 7 is an end elevation of the welding head as seen from the left of Fig. 2, showing in side elevation a friction compensating device.

Fig. 8 is a front elevation of a modified form of brush holder.

Fig. 9 is a vertical elevation of the brush holder partly broken away, as seen on the line 9—9 of Fig. 8.

Fig. 10 is a diagram of the welding circuit;

Fig. 11 is a diagram of the control circuit and

Fig. 12 is a developed plan of the brush arrangement.

Referring to Fig. 1, the apparatus includes a forming mill 10, having successive sets of forming rolls 12, operated by a common drive shaft 14 through gearing 15 for shaping a strip of metal stock 16 into a tube, as shown at 18, and feeding this tube to a welding head generally designated by 20, from which the welded tube as shown at 22 passes through a series of sizing, shaping and straightening rolls at 24 operated by the drive shaft 14. The shaft 14 is operated at any desired constant speed by an electric motor 26 through a reducing gear 28. The apparatus as thus far described is conventional.

Referring more particularly to Fig. 2, the welding head 20 is composed of a pair of welding rolls or electrodes 30 and 31 preferably formed of a hard material which is a good electrical conductor, such as bronze or copper. The electrodes are discs which are rigidly secured together by bolts 32, but insulated from each other by a central insulating disc 34, and by insulation 36 placed around the bolts 32. The faces of the rolls are formed with the usual chamfers 38, which conform to the tubing being welded and cooperate with corresponding chamfered portions of guide rolls 40, to form the welding throat. Preferably the insulating disc 34 terminates radially inside of the welding faces of the rolls, as shown in Fig. 2. The rolls are supported on and keyed to a shaft 42 by being bolted to but insulated from hub 44, which is suitably keyed to the shaft. Insulation 45 may also be placed between the electrodes and the shaft.

Formed integral with each of the electrode rolls is a current conducting drum 46 or 47 on the surface of which press brushes 48, which will be more particularly described below. Each of the drums is hollow and its open end is closed by a plate 50, suitably insulated either from the drum or from the shaft 42, the plates forming with the drum chambers 52 and 53 for the reception of cooling liquid such as water. The water may be supplied through a duct 54 formed in one end of the shaft 42 and may flow from the apparatus from a similar duct 56, formed in the other end of the shaft 42.

As shown best in Fig. 4, each of the electrode rolls has formed in its flat face, which is opposite the other electrode roll, an open groove 58 or 59, disposed as near the welding face 38 of the roll as practical. The grooves register face to face when the rolls are assembled, but are divided into two closed conduits or separate passages by the insulating disc 34. Each of these conduits passes entirely around the electrode roll. The groove 58 is provided with an inlet duct 60, leading from chamber 52, and adjacent the inlet duct is a dam 62 which forces liquid entering the groove by the duct 60 to flow entirely around the duct to an opening 64 formed in the insulating plate 34, and disposed on the side of the dam remote from duct 60 to provide an outlet from the duct 58 into the duct 59. The latter is provided with a similar dam 66 disposed adjacent its inlet opening 64 for forcing liquid to flow entirely around the duct 59 to a discharge duct 68, which is similar to duct 60 and leads to the chamber 53, whence liquid may leave the welding head by the discharge duct 56.

The shaft 42 is supported in bearings 70 on yoke arms 72 (Fig. 3) clamped to a rock shaft 74 pivoted at 75 to permit the welding head to be swung up or down with respect to the guide rolls 40. Rigidly secured with respect to the yoke arm 72, as by being clamped to the shaft 74 is an arm 76 cooperating with a stop screw 78 which determines the lowermost position of the welding head, that is to say, normal working position, the stop screw being adjustable to accommodate various sizes of rolls or tubing. The welding head rests upon the tubing, due to its own weight, which may be sufficient to provide the desired welding pressure. However, if it is desired to apply additional pressure to the stock being welded, this may be done through the adjustable rod 80 and loading spring 82, connected between the free ends of the yoke arms 72 and the frame or base 84 on the machine.

It has been found that the electrode rolls 30 and 31 wear with use so that the welding groove or channel 38 needs to be trued from time to time, for example, after the run of each 10 or 15 miles of tubing. For this purpose the sprocket wheel 85 is provided on the welding head and a sprocket wheel 85A is attached to the shaft which drives one of the shaping rolls 24. When it is desired to true the welding rolls a sprocket chain, not shown, is passed over these two wheels and the motor 26 is run to drive the welding head at the desired speed. Any suitable tool is held against the rolls and the required shape given to the grooves.

Referring particularly to Figures 2 and 3, welding current is supplied to the electrode rolls by means of the brushes 48 previously mentioned, mounted in brush holders 86 to which are connected suitable current conductors, such as the usual copper straps 88. Each brush is disposed in a guide socket 90, is connected to a current conducting bar 92 by the usual pigtail 94, and is provided with a pressure adjusting device, best shown in Figures 3 and 6, which consists of a plunger 100 sliding in a guide 102 supported on the bar 92 and loaded by a spring 104, the compression of which may be adjusted by a screw 106 threaded in the bar 92.

Fig. 12 is a diagrammatic development of the brush holder, showing the disposition of the individual brushes on the surface of the drum. Certain of the brushes are formed of material which provides lubrication for the surface of the drum, for example, a composition of 96% graphite and 4% powdered copper, while the remaining brushes are preferably formed of material which is designed to afford the highest degree of electric conduction without specific regard to its lubricating characteristics, for example, 85% powdered copper and 15% graphite. The brushes are arranged in a plurality of rows A, B, C, D, E, etc., and the number of rows is equal to or greater than the number of brushes in each row, which in the present example is 5. It will be noticed that the rows are staggered so that brushes in one row follow behind the gaps in the adjacent row, in the direction of rotation of the drum. The brushes are so arranged that all of the active surface of the drum is traversed by the lubricating brushes. This may be accomplished, for example by arranging the lubricating brushes diagonally across the brush pattern. Thus in Fig. 12 brushes A1, B1, C2, D2, E3, F3, C4, D4, E5, F5, are lubricating brushes, while the remainder are metal brushes.

The stock is fed through the welding machine by the force of the forming and sizing rolls 12 and 24 and in passing through the welding throat rotates the welding head entirely by the friction between the stock and the surfaces of the electrode rolls. It is important that there be no slipping between the electrode rolls and the stock being welded. Since the welding current required is very heavy, for example of the order of 20,000 to 25,000 amperes, a large number of brushes must be used and these offer a large frictional resistance to the rotation of the head. Therefore, it may be that in welding tubing of certain sizes or of certain wall thicknesses, the friction between the tube and the head is not sufficient to rotate the head without slippage, at least without deforming the tube wall. To take care of such instances I provide a friction compensating device shown best in Figs. 1 and 7. A motor 110 is arranged to apply torque to the shaft 42 through a reducing gear 112, sprocket chain drive 114 and overrunning clutch 116. The motor is arranged in any well known manner to apply a definitely limited torque to the shaft 42. This torque is adjusted so as to be equal to or less than the total frictional resistance to rotation of the welding head, including brush and bearing friction. Preferably the applied torque is to 80% or 90% of the frictional resistance and the motor is adjusted to provide this torque at a constant speed equal to the speed at which the head is rotated by the stock.

The overrunning clutch is provided to permit the welding head to be rotated without rotating the compensating motor, for example, when stock is being initially fed into the machine and no welding is being done.

If preferred the friction compensating motor 110 may also be used to drive the welding head for the purpose of truing the rolls, but in cases where such friction compensating motor is not used, or where if used it does not drive the rolls at the speed desired for metal turning, the sprockets 85 and 85A, previously referred to, are advantageous.

Figures 8 and 9 show a modified form of brush holder and brush pressure adjusting device, in which a brush plate 120 conforming to the current conducting drum 46 or 47, is provided with the required openings or brush sockets 121 for receiving the brushes 48 which are connected by the usual pigtails 94 to current conducting bars 122 in turn connected to the current supply in any suitable manner, not shown. The plate 120 forms one wall of a housing or conduit 124 which is closed except for the brush openings 121. Air or other suitable fluid is supplied to the housing 124 by any suitable source of supply under pressure, herein represented by the pipe 126. It will be evident that two brush holders are provided, one for each drum, and these may be connected to a single pipe or other source of air supply 128 by the twin conduits 126. Any suitable air pressure, for example, two pounds per square inch is constantly maintained in the housing 124 for exerting the required force on the brushes to maintain contact with the drums. The brush sockets 121 are made slightly larger than the brushes 48 in order to provide channels or passages for cooling air along the surfaces of the brushes. Air being constantly supplied to the pipes 126, constantly leaks out of the openings 121, and the relation between the supply and the rate of leakage is adjusted to maintain any desired constant pressure in the housing. The current of air over the surfaces of the brushes cools the latter and materially increases their current carrying capacity. This permits the transmission to the drums of a high value of welding current with the minimum number of brushes. It will be appreciated that this reduces the total friction of the brushes on the drums, since a definite brush pressure is required on each brush to transmit the current satisfactorily. The air currents passing along the brushes strike the drums in a direction normal to their surfaces and spread out over the surfaces, exerting some cooling effect on the drums. If desired, dampers 130 may be provided in the pipes 126 for regulating the air supply.

The apparatus described herein may be used with either direct or alternating current, but I prefer to use direct current, as this facilitates the production of a uniform weld and makes one which I believe to be superior to welds made by alternating current. When using direct current, the speed of the stock and the strength of the current are so correlated that the desired character of weld is uniformly produced. The stock must be moved rapidly enough to prevent burning or overheating with any given value of current. By properly proportioning the speed and strength of current, and by proper application of the welding electrodes as regards both pressure and length of the arc of contact with the tube being welded, I find that a satisfactory weld can be formed which heats the stock only a short distance back from the seam cleft, and produces a very slight upset, flash or burr on the finished product. Furthermore the weld is uniform in character along the seam. For example, when welding steel tubing whose wall is .048 inches in thickness, and whose diameter is approximately 1⅜ inches, with an apparent current of 19,000 amperes at a voltage of 1.5 volts, a tube speed of 42 feet per minute produces a satisfactory weld. I find that by increasing the tube speed to 56 feet per minute a satisfactory weld can be obtained with 24,000 amperes apparent current. In other words, tubing can be welded satisfactorily at high speed more economically than at low speed, the energy required per unit of tubing being less.

When using alternating current, the current strength and speed of the stock must be correlated as explained above, and in addition these must be so related to the frequency of the current that the individual welded spots produced by each surge or impulse of current overlap to produce a continuous weld. Such weld will not be uniform as in the case of direct current, but will be what is known as recurrent.

Fig. 10 shows one form of welding circuit for supplying current to the welding head. The welding circuit in general includes a heavy current circuit and an exciter circuit. The heavy current circuit consists of the armature 200 of a heavy current generator, which is directly connected to the two sets of brushes 48. If desired, an ammeter 202 may be used to indicate the value of the current. The field 204 of the heavy current generator is supplied with current by a separate exciter, the armature 206 of which is directly connected by mains 210 to the field 204, while its field 208 may be energized by being connected across the armature 206. The generator armatures 200 and 206 are driven by suitable prime movers at a constant speed and the voltage of the exciter is carefully maintained at a constant value. In this manner the welding current at the brushes 48 is maintained at a constant value. Placed in the circuit of the generator field 204 is a time interlock 212, to be more fully described, for the purpose of preventing the field circuit from being opened to interrupt the welding current until a predetermined period after stopping of the apparatus which feeds the stock to the welding head.

In continuous welding, it is at times necessary to start and stop the machine during the run of a length of stock. The driving apparatus of the welding machine has considerable inertia, so that after the power to the drive motor 26 is interrupted the apparatus will coast, and an appreciable length of tubing, for example 6 inches, will be run through the machine before the stock comes to rest. It is essential to maintaining a continuous weld that the welding current be maintained in the stock during this period of coasting, and it is likewise essential to avoid burning the stock that the current be interrupted substantially at the instant the stock stops.

Conversely, although the driving motor may start the stock substantially instantaneously upon application of power, it has been found that the welding circuit has such electrical characteristics, such as high inductance, that a considerable period of time elapses between the connection of the generator field 204 to the current supply 210, and the establishment of the welding value of current at the rolls. This interval of time is of the order of one or two seconds, and since tubing may be welded at the rate of 60 feet per minute, and even much higher speeds, it will readily be seen that if the driving motor is started at the same instant of time that current is supplied to the field, an appreciable length of tubing, perhaps as much as several feet, may be run through the head without welding.

*Control circuit*

My invention contemplates a suitable automatic control system for insuring that a welding current will be established before the stock begins to move, and that a welding current will be maintained as long as the stock is in motion. One form of such control system is shown diagrammatically in Fig. 11. In this figure, 26 represents the main driving motor which can be supplied with current from suitable mains 220 under the control of a switch 222, normally open, but which may be closed when it is desired to operate the motor, by the solenoid 224.

If it is desired to operate the motor without welding stock, for example, when stock is being initially fed into the machine, the switch 222 is closed but the welding current is not turned on. The closing of the switch in these circumstances is accomplished by depressing the switch 226, which establishes current through the solenoid 224 as follows: From main 220A by wire 228 to one side of the solenoid winding, thence from the other side of the winding by wires 230 and 232 through the switch 226 and wires 234 and 236 to main 220B. This switch 226 automatically opens when released, and so advances the work only when manually held closed.

Starting

When it is desired to start the welding operation, the field 204 of Fig. 10 is first connected to the exciter and after the current has attained welding value the drive motor 26 is started. This is accomplished as follows: A generator control switch 240 which is normally in the open position shown in Fig. 11 is moved to the right by a solenoid 242 energized under the control of the start button 244 as follows: One end of the solenoid winding, being permanently connected to the power main 220B through wire 246 and previously mentioned wire 236, the other end of the solenoid winding is now connected through wire 248 and depressed start button 244 to wires 250 and 252, to previously mentioned wire 228, which leads to main 220A. When the solenoid 242 is thus energized the generator switch bar 240 is moved to the right, closing contacts 254, 256, and 258 and opening contacts 260. The closing of contacts 254 short circuits the start button 244 by connecting wire 248 through wires 262 and 264, previously mentioned closed interlock switch 212 and wire 265 to wire 252, which as has been previously mentioned leads to the main 220A through wire 228. This continues to supply the solenoid 242 with current and hold the switch in its operating position even after the start button has been released by the operator. At the same time contacts 260 are opened, breaking the circuit through the field discharge resistance 266, which was previously connected across the field 204 by the wire 268, switch contacts 260 and wire 170. Opening the circuit of the field resistance permits the field to be built up when supplied with current, the supply being established simultaneously with the opening of the field discharge resistance circuit by the closing of contacts 256 and 268 of switch 240 which connect the field 204 through wires 268 and 270 to the mains 210 which lead to the exciter armature.

Closing of the switch 240 also sets in operation the time interlock 272 which normally holds open a relay or switch 274, but after a lapse of a predetermined time closes this switch. Closing of the interlock switch 274 closes the drive motor switch 222 by connecting wire 246 (which as has been previously noted is continuously connected to the main 220B) through wire 276, closed switch contact 278, wire 280 to previously mentioned wire 230 leading to one side of the motor switch solenoid 224, the other side of which is permanently connected by wire 228 to the main 220A. The time of operation of the interlock 272 is adjusted so that the drive motor 26 begins to move the stock substantially simultaneously with the establishment of a welding value of current at the electrode rolls. This avoids running through a length of stock which is not welded and it is important that the stock start to move as soon as welding current is established, otherwise overheating may occur.

Stopping

When it is desired to stop the operation of the welding machine the power to the drive motor 26 is first interrupted, and at the end of a predetermined period of time thereafter, the welding current is interrupted. This is accomplished as follows: A switch 284, which may be called the stopping switch, is normally in the position shown in Fig. 11 with contact 278 (previously referred to) closed to complete the holding circuit for the motor switch solenoid 224. The stopping switch 284 may be operated by a solenoid 286 which may be energized by depressing the stop button 288, through the following circuit. It will be noted that one side of the solenoid 286 is permanently connected to wire 276, which when the apparatus is running is connected through the interlock switch 274 to the wire 246 which is permanently connected to the main 220B. The other side of the solenoid 286 is now connected by wire 290 to the stop button 288, thence by wire 292 to wire 264, closed interlock switch 212, previously referred to, wire 265 to wire 252 and through wire 228 to power main 220A. This energizing of the solenoid 286 moves the switch bar to the right and opens the contact 278 which immediately de-energizes the motor switch solenoid 224 and interrupts the supply of power to the drive motor. Simultaneously contacts 296 of stopping switch 284 are closed, short-circuiting the stop button to hold the switch 284 in the position to which it has just been moved, even in the event that the stop button should be released by the operator. This is accomplished by connecting wire 290 (leading from one side of the solenoid) through contacts 296 to wire 300 which leads to wire 264 and thence to power main 220A, as has been previously described. Closing of the switch 284 initiates the operation of a time interlock 302, which after a predetermined period of time opens the normally closed interlock switch 212, previously mentioned, and deenergizes the generator switch solenoid 242 by interrupting the holding circuit, previously described, from contact 254 through wire 262, wire 264, switch 212, wires 265, 252, and 228. Interruption of the holding circuit of the solenoid 242 permits the switch 240 to open. This de-energizes the field 204 and stops the welding current. The time interlock 302 is so adjusted with respect to the inertia of the driving motor and its associated apparatus that the welding current is interrupted substantially simultaneously with the stopping of the stock. This insures that the seam will be welded as long as the stock is in motion and that overheating will not occur at the point where the stock comes to rest. If the heavy current circuit and its attendant exciter circuits should be of such characteristics that the welding current continues for any brief period of time after the opening of the exciter field switch, the time interlock 302 will be adjusted accordingly to stop the welding current simultaneously with coming to rest of the stock.

I claim:

1. In a continuous welding apparatus, the combination of means adapted to feed continuously stock to be welded, means adapted to supply continuously welding current to the stock, and means for energizing the current supply means and for thereafter starting the feeding means.

2. In a continuous welding apparatus, the combination of means adapted continuously to feed stock to be welded, a circuit for continuously supplying welding current to the stock, and means for energizing the circuit and for thereafter starting the feeding means, the electrical characteristics of the welding circuit being so related to the starting and feeding means that a welding value of current is established substantially simultaneously with the starting of the movement of the stock.

3. In a continuous welding apparatus, the combination of means for feeding stock to be welded, a motor for driving said means, a switch for operating the motor, means for supplying welding current to the stock, a switch for energizing the current supply means, means for closing the energizing switch, and means set in operation by the closing of the energizing switch for closing the motor switch after a predetermined interval of time.

4. In a continuous welding apparatus, the combination of power driven means for feeding stock to be welded, means for continuously supplying welding current to the stock, means for interrupting the power supply to the feeding means, the current supply means being adapted to maintain a welding value of current in the stock for a predetermined period of time after the interruption of power to the feeding means.

5. In a continuous welding apparatus, the combination of power driven means for continuously feeding stock to be welded, means for continuously supplying welding current to the stock, means for interrupting the power supply and for interrupting the welding current a predetermined period of time thereafter, the period of time and the inertia of the feeding means being so related that the welding current is interrupted substantially simultaneously with the stopping of motion of the stock.

6. In a continuous welding apparatus, a combination of means for feeding stock to be welded including a driving motor, a switch for controlling the motor, a circuit for supplying welding current to the stock, a switch for energizing the circuit, means for opening the motor switch and means set in operation simultaneously with the opening of the motor switch for opening the energizing switch after a predetermined elapsed time.

7. In a continuous welding apparatus, a combination of means for feeding stock to be welded including a driving motor, a switch for controlling the motor, a circuit for supplying welding current to the stock, a switch for energizing the circuit, means for opening the motor switch and means set in operation simultaneously with the opening of the motor switch for opening the energizing switch after a predetermined elapsed time, said time interval being so related to the inertia of the feeding means that a welding current is maintained in the circuit as long as the stock is in motion.

8. In a continuous welding apparatus the combination of means adapted continuously to feed stock to be welded, a source of power for operating the feeding means, a circuit adapted continuously to supply welding current to the stock, means for establishing and interrupting the power supply, and means for energizing and de-energizing the circuit, the relation between the last two mentioned means being such that the power supply is automatically established a predetermined time after the circuit is energized, and the circuit is de-energized a predetermined time after the interruption of the power supply.

9. In a continuous welding apparatus the combination of means including a motor for continuously feeding stock to be welded, a circuit for continuously supplying welding current to the stock, a switch for starting and stopping the motor, a switch for energizing and de-energizing the welding circuit, means operated simultaneously with closing of the energizing switch for closing the motor switch after a definite time interval, and means operated simultaneously with opening of the motor switch for opening the energizing switch after a definite time interval.

10. In a continuous welding apparatus, the combination of a rotatable welding head, means for feeding stock to be welded in contact with the head, the stock in its movement being adapted to rotate the head and means for supplying to the head a torque not greater than the inherent frictional resistance to rotation of the head.

11. In a continuous welding apparatus, the combination of a rotatable welding head, means for feeding stock to be welded in contact with the head, the stock in its movement being adapted to rotate the head and a motor of definitely limited torque connected to the head, the torque of said motor being equal to or less than the inherent frictional resistance to rotation of the head.

12. An apparatus of the character described comprising the combination of a movable current conducting member, a brush contacting with said member for the transmission of current, and means for directing a current of cooling air over the brush in a direction normal to the surface of the current conducting member.

13. A welding head comprising in combination, a pair of electrode rolls rigidly secured together but insulated from one another, and means for conducting cooling liquid first substantially completely around the periphery of one roll and then substantially completely around the periphery of the other roll.

14. A welding head comprising in combination, a pair of electrode rolls rigidly secured together face to face, a groove in the face of each roll, said grooves being disposed opposite each other, and an insulating member between the rolls to separate the rolls electrically, said insulating member forming, with each groove, an enclosed conduit for circulating cooling liquid.

15. A welding head comprising in combination, a pair of electrode rolls rigidly secured together face to face, a groove in the face of each roll, said grooves being disposed opposite each other, and an insulating member between the rolls to separate the rolls electrically, said insulating member forming, with each groove, an enclosed conduit for circulating cooling liquid, a passage in the insulating member between the conduits, a duct for conducting liquid to one groove adjacent the passage, a duct for conducting liquid from the other groove adjacent said passage, and a dam in each groove between the passage and the duct for directing cooling liquid along substantialy the entire length of the groove.

DANIEL C. McGUIRE.